US008013899B2

(12) United States Patent
Gillard et al.

(10) Patent No.: US 8,013,899 B2
(45) Date of Patent: Sep. 6, 2011

(54) CAMERA ARRANGEMENT AND METHOD

(75) Inventors: Clive Henry Gillard, Alton (GB);
Simon Dominic Haynes, Fleet (GB);
Robert Mark Stefan Porter, Winchester (GB)

(73) Assignee: Sony United Kingdom Limited, Weybridge (GB)

( * ) Notice: Subject to any disclaimer, the term of this patent is extended or adjusted under 35 U.S.C. 154(b) by 814 days.

(21) Appl. No.: 11/949,449

(22) Filed: Dec. 3, 2007

(65) Prior Publication Data

US 2008/0143842 A1  Jun. 19, 2008

(30) Foreign Application Priority Data

Dec. 6, 2006 (GB) .................................. 0624410.7
Apr. 12, 2007 (GB) .................................. 0707068.3

(51) Int. Cl.
*H04N 5/225* (2006.01)
(52) U.S. Cl. .................. 348/218.1; 348/38; 348/157
(58) Field of Classification Search .................. None
See application file for complete search history.

(56) References Cited

U.S. PATENT DOCUMENTS

| 5,949,477 | A  | * | 9/1999  | Hoglin .............................. 348/47 |
| 5,978,015 | A  | * | 11/1999 | Ishibashi et al. .................. 348/47 |
| 6,023,588 | A  | * | 2/2000  | Ray et al. .......................... 396/20 |
| 6,677,982 | B1 | * | 1/2004  | Chen et al. ........................ 348/36 |
| 7,193,645 | B1 | * | 3/2007  | Aagaard et al. ............. 348/211.3 |
| 2002/0122113 | A1 |   | 9/2002  | Foote |
| 2003/0185340 | A1 | * | 10/2003 | Frantz ............................. 378/57 |
| 2004/0061774 | A1 | * | 4/2004  | Wachtel et al. .................. 348/36 |
| 2004/0183941 | A1 | * | 9/2004  | McCutchen ................... 348/373 |
| 2006/0125921 | A1 |   | 6/2006  | Foote |
| 2006/0165395 | A1 | * | 7/2006  | Shimano et al. ................. 396/54 |
| 2006/0181610 | A1 | * | 8/2006  | Carlsson et al. ............... 348/159 |
| 2006/0228018 | A1 | * | 10/2006 | Abramovich et al. ........ 382/141 |
| 2008/0225121 | A1 | * | 9/2008  | Yoshida et al. ............... 348/159 |

FOREIGN PATENT DOCUMENTS

| JP | 11008843 A    | * | 1/1999  |
| JP | 2004135209 A  | * | 4/2004  |
| WO | WO 03/087929 A1 |  | 10/2003 |

* cited by examiner

*Primary Examiner* — Lin Ye
*Assistant Examiner* — Dennis Hogue
(74) *Attorney, Agent, or Firm* — Oblon, Spivak, McClelland, Maier & Neustadt, L.L.P.

(57) ABSTRACT

A camera arrangement comprising a plurality of camera elements and a corresponding method of arranging camera elements is described. The camera arrangement improves the resolution of a stitched image by maintaining a uniform overlap between the fields of view of adjacent camera element. The uniform overlap is achieved. This is because the amount of unnecessary overlap required to achieve the required degree of overlap is reduced.

16 Claims, 15 Drawing Sheets

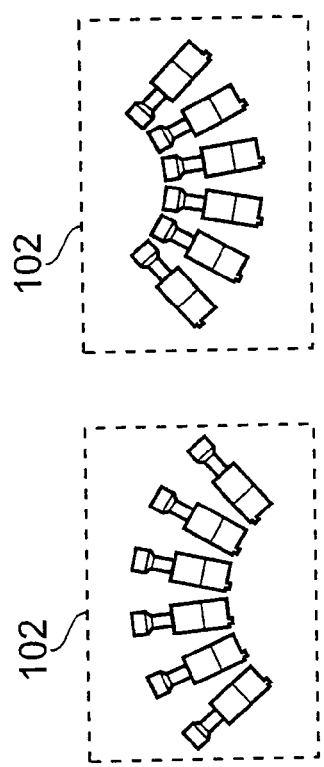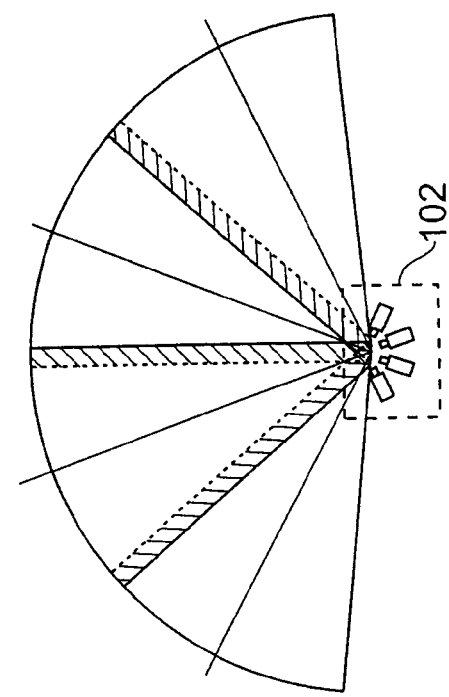

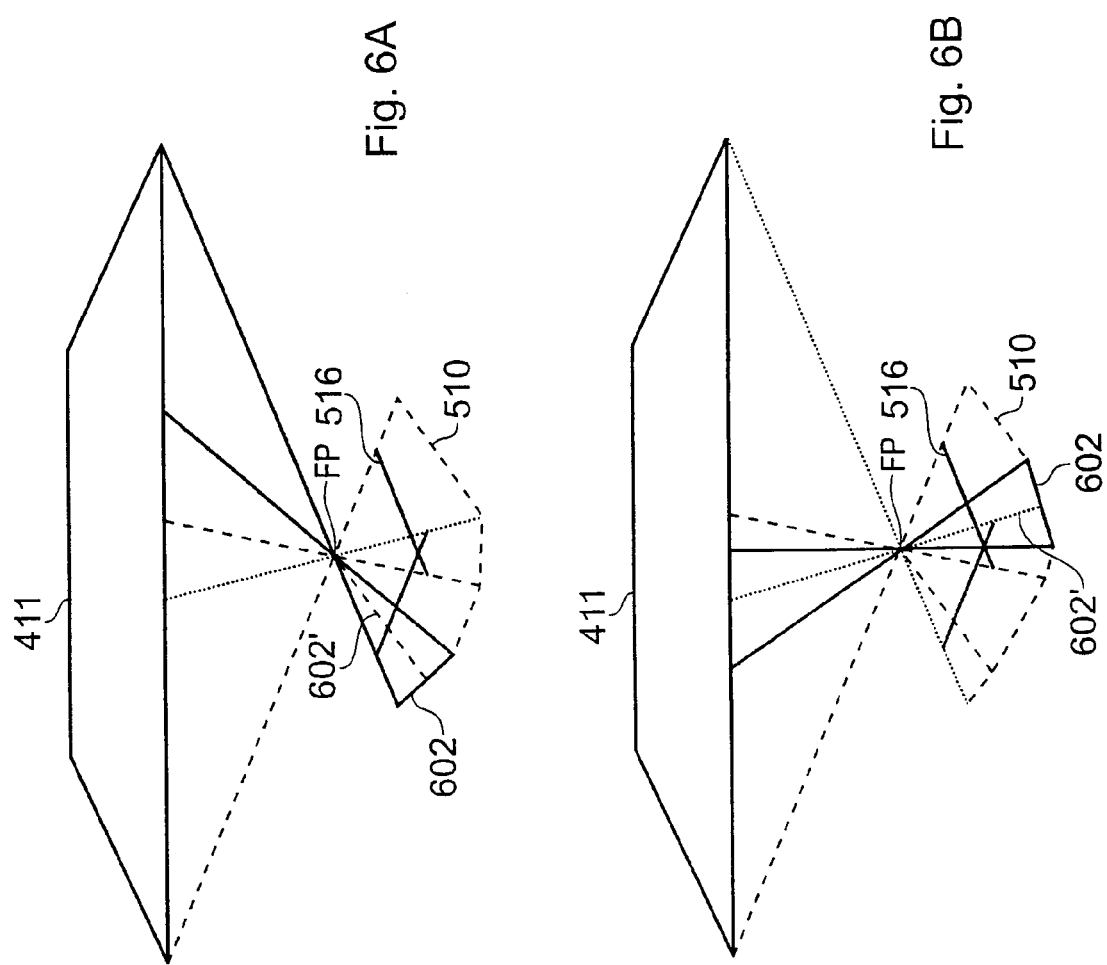

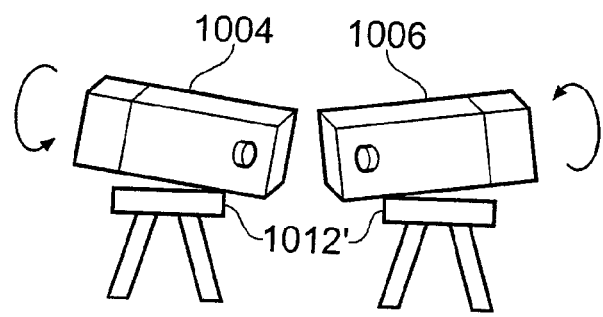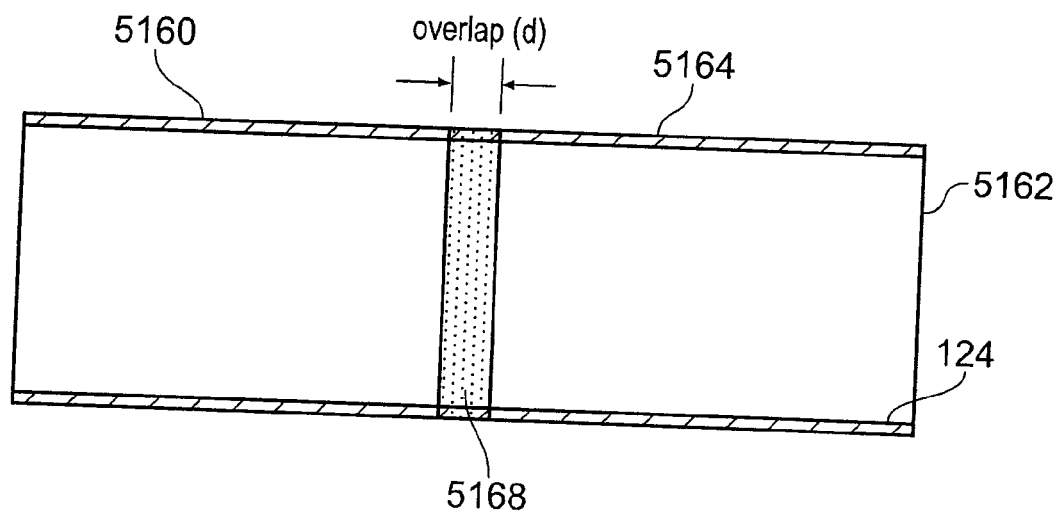
Fig. 11

CAMERA ARRANGEMENT AND METHOD

BACKGROUND OF THE INVENTION

1. Field of the Invention

The present invention relates to a camera arrangement and method.

2. Description of the Prior Art

A prior art device for producing a panoramic view from a number of cameras exists. This is described in US-A-2006/0125921 and relates to a video conferencing system. This device allows a group of individual co-located cameras to capture different fields of view of a scene. The images captured by these co-located cameras are then "stitched" together to form a panoramic image. In US-A-2006/0125921, the panoramic image is generated by warping and stitching together quadrilateral portions of the images from each camera.

Further, it is described in US-A-2006/0125921 that a section of the composite image can be extracted and displayed.

However, such a prior art device has very limited capabilities. For example, the device in US-A-2006/0125921 is only suitable for low resolution panoramic images. This is because the techniques for extracting sections of the panoramic image described in US-A-2006/0125921 will result in distortion to the extracted sections.

Additionally, with such a prior art device having low resolution panoramic images, the resolution of the extracted sections will be limited. This means that, with the ever increasing number of high definition devices being used by consumers, the use of the system in the prior art is particularly limited.

SUMMARY OF THE INVENTION

It is an aim and object of the present invention to address the problems associated with the prior art device.

According to one aspect of the present invention, there is provided a camera arrangement comprising a plurality of substantially co-located camera elements, each camera element having a focal plane upon which a respective field of view is imparted, wherein the field of view of one of the camera elements overlaps the field of view of at least one adjacent camera element, wherein, after movement of the field of view of one camera element, the positioning of said one camera element is such that said overlap between the field of view of said one camera element and said at least one adjacent camera element is substantially uniform along the length of the overlap. This is advantageous because the amount of unnecessary overlap between the fields of view, and thus the focal planes, is reduced. This improves horizontal and vertical resolution of the correspondingly produced stitched image.

The said one camera element and/or said adjacent camera element in the arrangement may comprise a camera element adjuster operable to adjust any one or more of the pitch, yaw and roll positioning of said one camera element and/or said adjacent camera element so that said overlap is substantially uniform along the length of the overlap.

Further, the roll of either said one camera element or said adjacent camera element may be adjustable after said movement of said field of view of said one camera element along the vertical axis of the field of view.

The arrangement may comprise an arrangement adjuster operative to adjust either one of the pitch and the yaw of the camera arrangement.

In this case, the arrangement may comprise a platform having a mounting and the platform may be operable to locate said one and at least one said adjacent camera elements thereon, the mounting being arranged to adjust either the pitch and the yaw of the camera arrangement.

The arrangement adjuster may be operable such that said pitch or yaw of the camera arrangement is adjustable when the overlap between the field of view is substantially constant along the length of the overlap.

At least one of the camera elements may be fixedly mounted to the arrangement adjuster.

According to another aspect, there is provided a method of arranging a plurality of co-located camera elements, comprising the steps of:

overlapping the field of view of one camera element with the field of view of at least one other camera element, wherein the fields of view are movable and imparted onto a focal plane of said respective camera elements; and positioning, after movement of said field of view of said one camera element, said one camera element such that said overlap between the field of view of said one camera element and said at least one adjacent camera element is substantially uniform along the length of the overlap.

The method may comprise adjusting any one of the pitch, yaw and roll positioning of said one camera element and/or said adjacent camera element so that said overlap is substantially uniform along the length of the overlap.

The method may comprise adjusting said roll of either one of said one camera element or said adjacent camera element after said movement of said field of view of said one camera element along the vertical axis of the field of view.

The method may comprise adjusting either one of the pitch and the yaw of the camera arrangement.

The method may comprise mounting, on a platform, said one and at least one of said adjacent camera elements and adjusting either the pitch and the yaw of platform to adjust either the pitch and yaw of the camera arrangement.

The method may comprise adjusting either one of said pitch or yaw of the camera arrangement when the overlap between the field of view is substantially constant along the length of the overlap.

The method may comprise mounting, on a platform said one and at least one adjacent camera elements, and adjusting the yaw of said one camera element and/or said at least one adjacent camera element to achieve desired overlap.

The method may comprise fixedly mounting at least one camera element to the platform.

BRIEF DESCRIPTION OF DRAWINGS

The above and other objects, features and advantages of the invention will be apparent from the following detailed description of illustrative embodiments which is to be read in connection with the accompanying drawings, in which:

FIGS. 2A and 2B are diagrams showing two alternative camera configurations in the system of FIG. 1;

FIG. 2C is a diagram showing the field of vision of the camera cluster shown in FIG. 2B;

FIGS. 6A and 6B are diagrams describing a process to generate a segment from the image generated in the projection process of FIG. 5B;

FIG. 11 is a diagram describing a camera arrangement according to one embodiment of the present invention and the corresponding focal plane;

DESCRIPTION OF THE PREFERRED EMBODIMENTS

Figure 1:
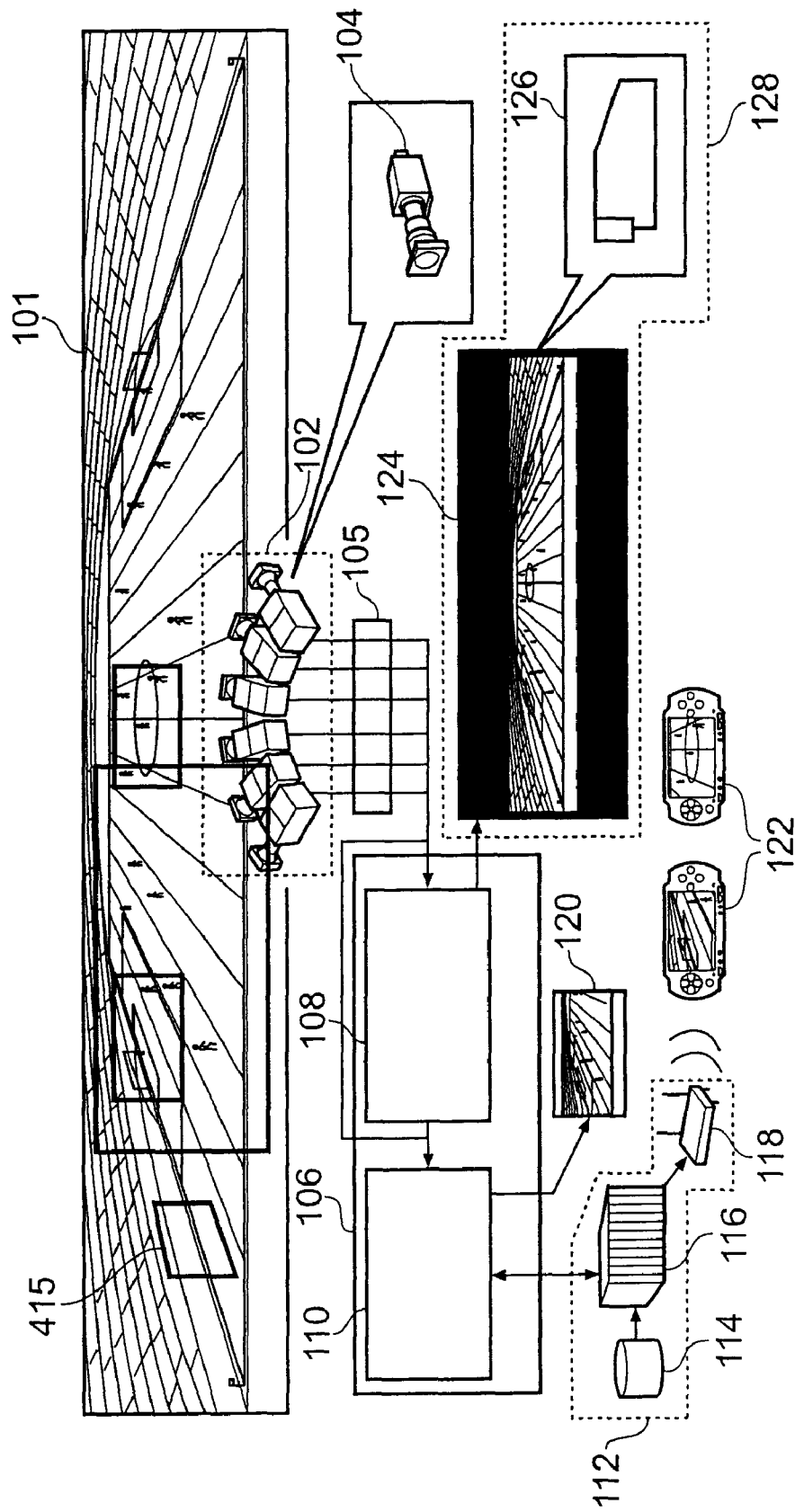
FIG. 1 is a schematic diagram showing a system for performing image stitching containing a camera arrangement according embodiments of the present invention.

Referring to FIG. 1, the live event 101, which in this example is a soccer match is held in a venue, which in this example is a stadium.

A camera cluster or camera arrangement 102, which in this case consists of six individual cameras 104 arranged in a certain configuration, is positioned at an appropriate vantage point in the stadium. The configuration of the camera cluster 102 will be explained in more detail with reference to FIGS. 2A, 2B and 2C. However, in summary, the camera cluster 102 is configured so that the field of view of each camera 104 within the camera cluster 102 overlaps to a small degree with the field of view of an adjacent camera 104 in the camera cluster 102. Thus, the entire live event is covered by panoramic view generated by the totality of the field of view of the camera cluster 102. The vantage point may be at an elevated position in the stadium.

In one embodiment, each camera 104 is a High Definition (HD) camera whose horizontal orientation is transformed by 90° so to produce a portrait image output having a resolution of 1080×1920 rather than 1920×1080 as in the case of a traditional landscape orientation. Additionally, each camera 104 in this embodiment is operating in progressive mode rather than interlaced mode. This makes processing of the images generated by the cameras 104 easier. However, the skilled person will appreciate that each camera 104 may, alternatively, operate in interlaced mode. Using a number of these cameras 104 in a camera cluster 102 arranged in the portrait mode allows an output from the camera cluster 102 to have a higher vertical picture resolution. The camera cluster 102 is used to produce a video stream of the soccer match. As the skilled person would appreciate, although the camera cluster 102 is described as being composed of a number of individual cameras 104, the present invention is not so limited. Indeed, the camera cluster need not be made up of a concatenation of complete cameras 104, merely camera elements that each produce an image output. The camera cluster 102 may therefore be a single unit. Furthermore, it is possible for one single camera to be used to generate one output image. In the case that the camera is used to capture a panoramic image, an appropriate wide angle lens and high resolution image capture array would be fitted to the camera.

In addition to the camera cluster 102, one or more microphones (not shown) may also be provided proximate the camera cluster 102 or disparate to the camera cluster 102 to provide audio coverage of the soccer match.

The output of each camera 104 in the camera cluster 102 is fed to a chromatic aberration corrector 105. In this example, each camera 104 within the camera cluster 102, produces an individual video output and so the camera cluster 102 has, in this case, six outputs. However, in other embodiments only one output of the camera cluster 102 may instead be used which is the multiplexed output of each of the six cameras 104. The output of the chromatic aberration corrector 105 is fed to an image stitching means 108 and a scalable content preparation means 110 which both form part of an image processing device 106. The image processing device 106 consists of the image stitching means 108 and the scalable content preparation means 110 and in this embodiment, will be realised on a computer. The output of the image stitching means 108 is connected to the scalable content preparation means 110.

The image stitching means 108 takes each high definition image captured by the respective camera 104 in the camera cluster 102 and combines them so as to produce a panoramic view of the venue. It is important to note that in this embodiment, the output of the image stitching means 108 is not simply the same view as taken using a wide angle lens. The output of image stitching means 108 is a tapestry, or conjoined, version of the output of each individual camera 104 in the camera cluster 102. This means that the output of the image stitching means 108 has a resolution of approximately 8000×2000 pixels rather than a resolution of 1080×1920 pixels as would be the case if one HD camera was fitted with a wide angle lens. The conjoined image is therefore an ultra high resolution image. However, a single camera having a high resolution can be used instead. In this case, parts of the image stitching means 108 would not be required. The advantages of the high definition arrangement are numerous including the ability to highlight particular features of a player without having to optically zoom and therefore affecting the overall image of the stadium. Further, the automatic tracking of an object is facilitated because the background of the event is static and there is a higher screen resolution of the object to be tracked. The image stitching means 108 is described in more detail with reference to FIG. 3.

The output of the image stitching means 108 is fed to either the scalable content preparation means 110 and/or one or more Super High Definition cinemas 128. In this embodiment, the or each super high definition cinema 128 is in a different location to the venue. This allows many spectators who are unable to attend the stadium due to shortage of capacity, or the location of the stadium, to view the live event. Additionally or alternatively, other locations around a stadium may be used to situate the super high definition cinema 128. For example, a bar in the stadium serving refreshments may be used.

The scalable content preparation means 110 is used to generate an image from the ultra high resolution output of the image stitching means 108 so that it may be used by one or more High Definition televisions 120, personal display device 122 having a screen size smaller than a traditional television and/or the super high definition cinemas 124. The scalable content preparation means 110 may generate either a scaled down version of the ultra high resolution image or may generate a segment of the ultra high resolution image using the mapping technique explained hereinafter. In one embodiment, the personal display device 122 is a PlayStation® Portable (PSP®). However, it is envisaged that the personal display device 122 may also be a cell phone, laptop, Personal Digital Assistant or the like or any combination thereof. Additionally, the scalable content preparation means 110 also implements an automatic tracking algorithm to select parts of the ultra-high resolution image to produce video streams for display on the personal display device 122. For example, the scalable content preparation means 110 may automatically track the ball or a particular player or even produce fixed shots of a particular special event, such as scoring a goal in a soccer match or a touch-down in a US Football game.

The output of the scalable content preparation means 110 is fed to a distribution means 112. The distribution means 112 consists of a content database 114 that stores content which may be also distributed, for example replays of special events, or further information relating to a particular player etc. Also within the distribution means 112 is a data streaming means 116 which converts the content to be distributed, either from the scalable content preparation means 110 or from the content database 114 into a format that has an appropriate bandwidth for the network over which the streamed data is to be fed or broadcast. For example, the data streaming means 116 may compress the stream such that it can be fed over an IEEE 802.11b WiFi network or over a cellular telephone network or any appropriate network, such as a Bluetooth network or a Wireless Network. In this embodiment, the network is a WiFi network which is appropriate for the personal display device 122 so the output of the data streaming means 110 is fed to a Wireless Router 118. Although the foregoing describes the data being fed over a WiFi network or a cellular telephone phone network, the invention is not so limited. The data streaming means 116 may compress the stream for broadcast over any network which supports streaming video data such as a $3^{rd}$ or $4^{th}$ generation cellular network, Digital Video Broadcast-Handheld (DVB-H) network, DAB network, T-DMB network, MediaFLO® network or the like.

The super high definition cinema 124 includes a large screen projector 126 and a screen 124. The output of the image stitching means 108 is fed to the large screen projector 126. In order to provide adequate resolution, the large screen projector 126 may have a display resolution of 8000×2000 pixels or may consist of two conjoined projectors each having a resolution of 4000×2000 pixels. Additionally, the large screen projector 126 may include watermarking technology which embeds a watermark into the displayed image to prevent a user viewing the live event in the super high definition cinema 124 from making an illegal copy of the event using a video camera. Watermarking technology is known and will not be explained in any further detail.

Referring to FIG. 2A, the lenses of the cameras 104 in the camera cluster 102 are arranged in a horizontally convex manner. Alternatively, in FIG. 2B, the camera lenses of cameras 104 in the camera cluster 102 are arranged in a horizontally concave manner. In either of the two alternative configurations, the cameras 104 in the camera cluster 102 are arranged to produce the minimum parallax effect between adjacent cameras 104 in the camera cluster 102. In other words, the cameras 104 in the camera cluster 102 are arranged such that the focal point of a pair of adjacent cameras are the closest together. The cameras 104 in the arrangement of FIG. 2B have been found to produce a slightly lower parallax error between adjacent cameras 104 than those of FIG. 2A.

In FIG. 2C, the field of view of the camera cluster 102 formed of four cameras arranged in a horizontally concave manner is shown. This is for ease of understanding and the skilled person would appreciate that any number of cameras can be used, including six as is the case with FIG. 1 or two as is the case with FIGS. 6A and 6B and 9 to 13. As noted above, in order to ensure that the entire event is captured by the camera cluster 102, in embodiments of the present invention, the field of view of one camera 104 in the camera cluster 102 slightly overlaps the field of view of another camera 104 in the camera cluster 102. This overlap is shown by the hashed area in FIG. 2C. As is explained hereinafter, the effect of the overlap in the conjoined image is reduced in the image stitching means 108. In the camera cluster 102 arranged in the horizontally concave manner, the amount of overlap between the field of view of different, adjacent, cameras 104 is substantially constant regardless of distance from the camera cluster 102. As the amount of overlap is substantially constant, the processing required to reduce the effect of the overlap is reduced. Although the above is described with reference to arranging the cameras in a horizontal manner, the skilled person will appreciate that the cameras may be arranged in a vertical manner.

As described in relation to FIG. 1, the output from the camera cluster 102 is fed into the chromatic aberration corrector 105. The chromatic aberration corrector 105 is known, but will be briefly described for completeness. The chromatic aberration error is corrected for each camera 104. The chromatic aberration manifests itself particularly at the edge of images generated by each camera 104. As already noted, the image output from each camera is 104 is stitched together. Therefore, in embodiments, the chromatic aberration is reduced by the chromatic aberration corrector 105 to improve the output ultra high resolution image.

The chromatic aberration corrector 105 separates the red, green and blue components of the image from each camera 104 for individual processing. The red and green and blue and green components are compared to generate red and blue correction coefficients. Once the red and blue correction coefficients are generated, the red and blue corrected image components are generated in a known manner. The corrected red and blue image components are then combined with the original green image. This forms a corrected output for each camera 104 which is subsequently fed to the image stitching means 108.

The image stitching means 108 then combines the aberration corrected individual outputs from each camera 104 into the single ultra high definition image. The combining process is described with reference to FIG. 3.

The output from the chromatic aberration corrector 105 is fed into an image alignment means 301 and a virtual image projection means 304. The output of the image alignment means 301 is fed a camera parameter calculation means 302. The output of the camera parameter calculation means 302 generates camera parameters which minimise the error in the overlap region between two adjacent cameras 104. In this embodiment, the error is the average mean squared error per pixel, although the invention is not so limited. Also, only the roll, pitch, yaw, barrel and focal length of each camera 104 are calculated. As the cameras 104 have similar focal lengths (the values of which are calculated) to reduce the parallax effect noted above and focal points, the relative position between the cameras is not considered. It is envisaged that other parameters may be found in order to allow for correction of lens distortion, spherical aberrations, and the like. Additionally, it is noted that chromatic aberration correction may again be performed after the alignment phase or after generation of the ultra high definition image.

The camera parameters are fed into the virtual image projection means 304. The output of the virtual image projection means 304 is fed into a colour correction means 306. The output of the colour correction means 306 is fed into an exposure correction means 308. The output of the exposure correction means 308 is fed into a parallax error correction means 310. The output of the parallax error correction means 310 is the single ultra high definition image. As noted earlier, it is possible to use an image generated by one camera. In this case, the virtual image projection means 304 would not be required.

Figure 4:
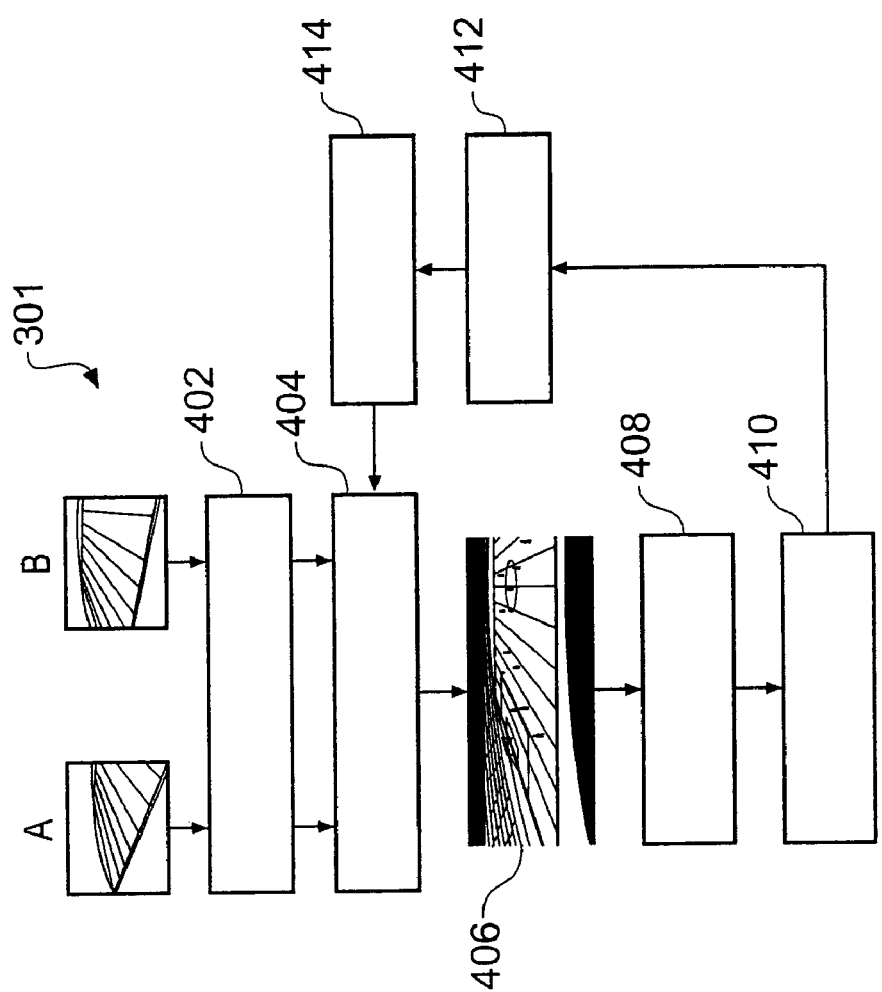
FIG. 4 is a diagram describing the alignment process shown in FIG. 3.

The image alignment means 301 is described with reference to FIG. 4. It is to be noted that the following only describes finding the camera parameters for two adjacent cameras. The skilled person will appreciate that using this method, the camera parameters for any number of cameras can be found.

Live images A and B are generated by two respective adjacent cameras 104 in the camera cluster 102. In order to minimise the error in the overlap region, a hierarchical search technique is used by the image alignment means 301. Using this method, it is assumed that the camera producing image A is fixed. Both live images are fed into a low pass filter 402. This removes the fine details of the image. By removing the fine detail of the image, the likelihood of the search finding a local minimum is reduced. The amount of filtering applied to each image may be varied during the search. For example, at the start of the search, a greater amount of filtering may be applied compared to at the end of a search. This means that an approximate value of the parameters may be generated and may be refined towards the end of the search allowing a greater amount of detail to be considered and to improve the results.

Figure 3:
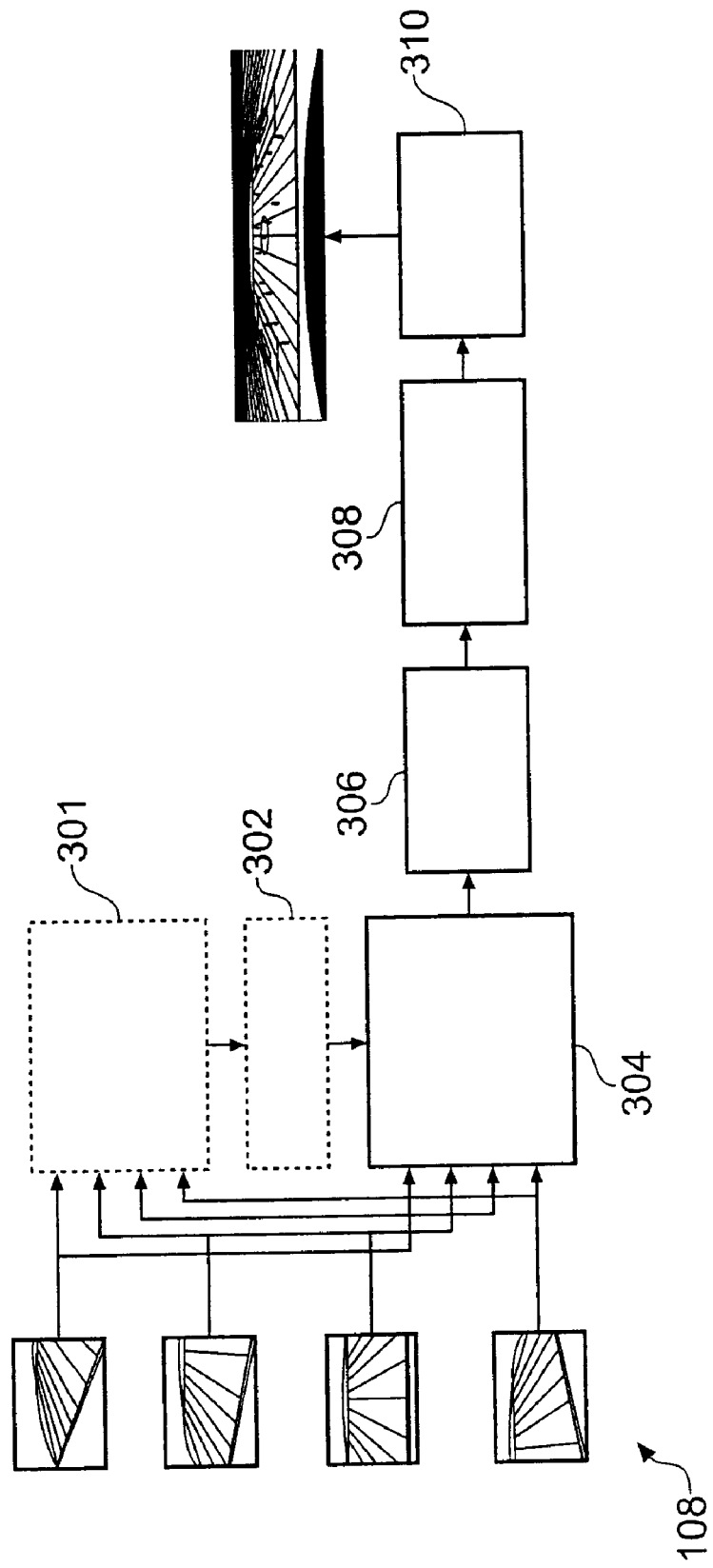
FIG. 3 is a diagram describing the stitching process implemented in the image stitching means shown in FIG. 1.

The low pass filtered images are then fed into the virtual image projection means 304 shown in FIG. 3. The virtual image projection means 304 is used to compensate for the fact that each camera 104 in the camera cluster 102 is facing in a different direction but the ultra high resolution image to be generated should appear to come from one camera pointing in one direction. The virtual image projection means 304 therefore maps one pixel of light received by one camera 104 onto a virtual focal plane. The virtual focal plane corresponds to the focal plane which would have been produced by a virtual camera capable of capturing the panoramic view with ultra high resolution. In other words, the output of the virtual camera would be the stitched ultra high resolution image. The manner in which the virtual image projection means 304 operates is described in reference to FIGS. 5A-5D.

In order to generate the ultra high definition image suited for a curved cinema screen, the virtual image projection means 304 maps each pixel of light received by one camera 104 onto an appropriately curved virtual focal plane. This is described with reference to FIGS. 5A and 5B. Alternatively, in order to generate the ultra high definition image suited for a flat cinema screen, the virtual image projection means 304 maps each pixel of light received by one camera onto a flat virtual focal plane. This is described with reference to FIGS. 5C and 5D.

Figure 5A:
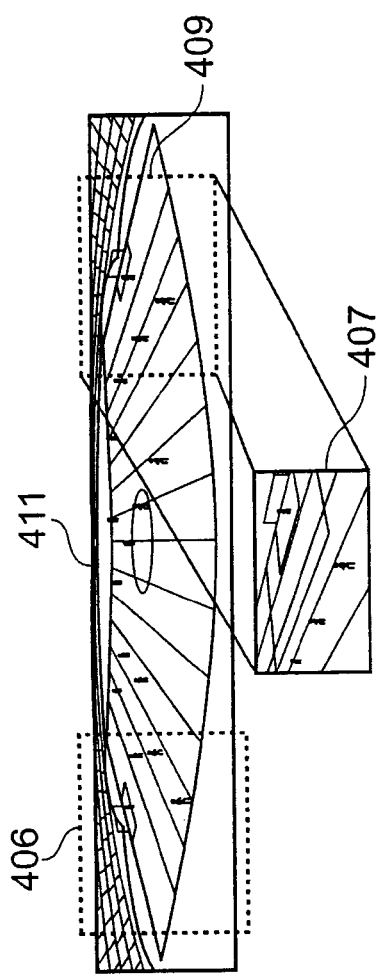
FIGS. 5A-5D are diagrams describing the projection process shown in FIG. 3.

Referring to FIG. 5A, the virtual image projection means 304 maps onto each pixel in the virtual curved focal plane 510, one pixel or an interpolation of more than one pixel from the camera 104 in the camera cluster 102. The virtual curved focal plane 510 defines the focal plane of the virtual camera. The effect of this mapping is shown in FIG. 5A as image 411.

Figure 5B:
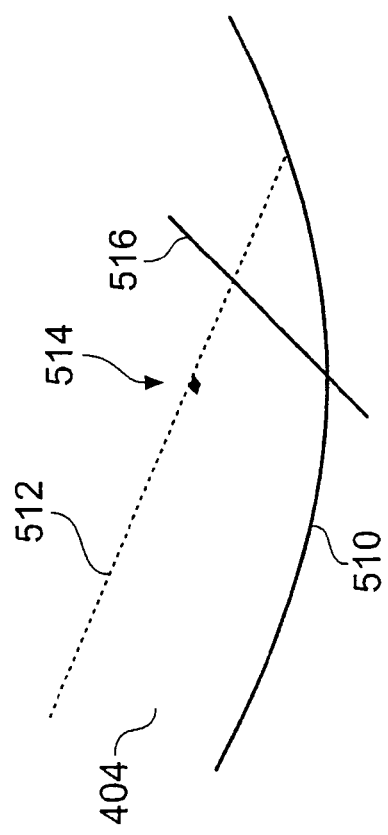

The mapping according to this embodiment is described with reference to FIG. 5B. The mapped image on the virtual curved focal plane 510 is generated one pixel at a time. Therefore, the following will only describe the mapping of one pixel onto a one-dimensional plane. However, the skilled person will be aware that in reality vector arithmetic will be used to extend this idea onto a two-dimensional plane.

The dotted line 512 represents a light ray from an object at the live event. The light ray passes through the focal point 514 of the camera 104 located in the camera cluster 102. The light ray then passes onto one pixel in the image array 516 in the camera 104. In this case, the pixel is a Charge Couple Device (CCD) pixel in the camera 104. The virtual curved focal plane is determined to be a distance behind the pixel in the image array 516. Of course, the virtual focal plane may be located in front of the image array 516. Additionally, it is possible that the virtual focal plane lies in a combination of in front of and behind the image array 516. Therefore, knowing the camera parameters (yaw, pitch, roll, barrel distortion etc) which were calculated earlier in the alignment phase and the distance behind the image array 516 of each pixel in the virtual curved focal plane 510, the virtual image projection means 304 can determine for each pixel on the virtual curved focal point 510, which pixel (or interpolated value of more than one pixels) on the image array 516 should be mapped to the pixel on the virtual curved focal plane 510. It should be noted that the pixel from the image array 516 may be filtered before being mapped to reduce aliasing effects. However, such filtering is not essential.

Further, as already mentioned, one pixel on the virtual curved focal plane may correspond to one pixel on the image array 516 or a combination of more than one pixel on the image array 516. In particular, it may be that the pixel on the virtual curved focal point may be an interpolated value of more than one pixel on the image array 516. This interpolated value may be an average value, a weighted average or any other form of suitable interpolation which may depend on the proximity of the mapped pixel to one pixel on the image array 516 compared with another pixel on the image array 516. As will also be explained later, particularly in areas of overlap of the field of view of two different cameras 104 in the camera cluster 102, a pixel on the curved virtual focal plane 510 may be a pixel value or an interpolated combination of more than one pixel from image arrays 516 of different alternative cameras.

Figure 5C:
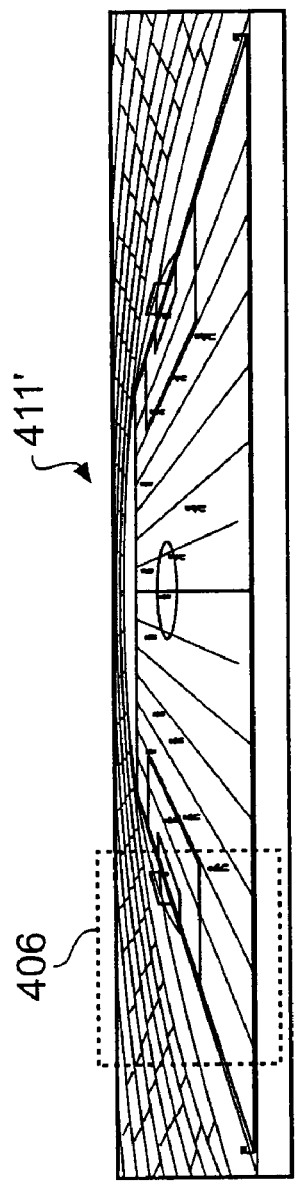

Referring to FIG. 5C, the virtual image projection means 304 maps onto each pixel in the virtual flat focal plane 510', one pixel or an interpolation of more than one pixel from the camera 104 in the camera cluster. The virtual flat focal plane 510' defines the focal plane of the virtual camera. The effect of this mapping is shown in FIG. 5C as image 411'.

Figure 5D:
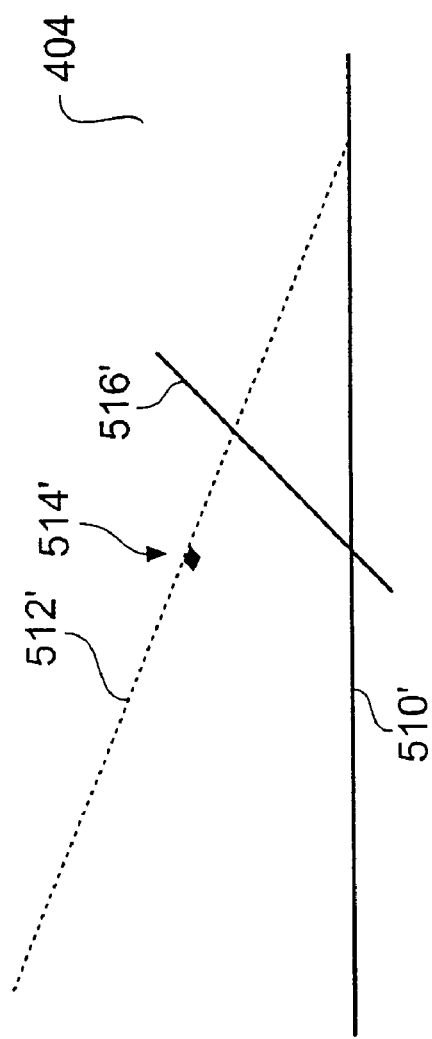

The mapping is described with reference to FIG. 5D. The mapped image on the virtual flat focal plane is generated one pixel at a time. Therefore, the following will only describe the mapping of one pixel onto a one-dimensional plane. However, the skilled person will be aware that in reality vector arithmetic will be used to extend this idea onto a two-dimensional plane.

The dotted line 512' represents a light ray from an object at the live event. The light ray passes through the focal point 514' of the camera 104 located in the camera cluster 102. The light ray then passes onto one pixel in the image array 516' in the camera 104. In this case, the pixel is a Charge Couple Device (CCD) pixel in the camera 104. The virtual flat focal plane is determined to be a distance behind the pixel in the image array 516'. Of course, the virtual focal plane may be located in front of the image array 516. Additionally, it is possible that the virtual focal plane lies in a combination of in front of and behind the image array 516. Therefore, knowing the camera parameters (yaw, pitch, roll, barrel distortion etc) which were calculated earlier in the alignment phase and the distance behind the image array 516' of each pixel in the virtual flat focal plane, the virtual image projection means 304 can determine for each pixel on the virtual flat focal plane 510', which pixel (or interpolated value of more than one pixels) on the image array 516' should be mapped to the pixel on the virtual flat focal point 510'. It should be noted that the pixel from the image array 510 may be filtered before being mapped to reduce aliasing effects. However, such filtering is not essential.

Further, as already mentioned, one pixel on the virtual flat focal plane may correspond to one pixel on the image array 516' or a combination of more than one pixels on the image array 516'. In particular, it may be that the pixel on the virtual flat focal point may be an interpolated value of more than one pixel on the image array 516'. This interpolated value may be an average value, a weighted average or any other form of suitable interpolation which may depend on the proximity of the mapped pixel to one pixel on the image array 516' compared with another pixel on the image array 516'. As will also be explained later, particularly in areas of overlap of the field of view of two different cameras 104 in the camera cluster 102, a pixel on the virtual flat focal plane 510' may be a pixel value or an interpolated combination of more than one pixel from image arrays 516' of different alternative cameras.

When the ultra high resolution image is generated by being projected onto a flat virtual focal plane, the aspect ratio appears, to the user, to be slightly incorrect. This is particularly apparent when viewing the whole image. In order to reduce this effect, the aspect ratio of the flat virtual focal plane is adjusted. However, this results in the divergence of vertical images. Therefore, in one embodiment, an appropriate aspect ratio which takes account of the above phenomena is determined.

Returning to FIG. 4, after the image has been mapped (resulting in a shot similar to that shown in 406), the mapped image is fed into an exposure corrector 408. The exposure corrector 408 is configured to analyse the exposure and/or colourimetry of the overlap images produced by each camera 104 in the camera cluster 102. With this information, the exposure corrector 408 adjusts the exposure and/or colourimetry parameters of one camera to match those of the other camera. Alternatively, the exposure and/or colourimetry settings of one camera are adjusted such that any sudden changes in exposure and/or colourimetry are removed. However, it is possible that a combination of the above alternatives is utilised. It is advantageous to correct the exposure and/or colourimetry during the alignment process as this results in improved camera parameters. However, it is envisaged that such parameters need not be corrected during the alignment process. If such parameters are not considered during alignment of the cameras, then such correction can be carried out on the images output from the cameras. In this case, it is to be noted that adjusting the image output from one camera to match the exposure and/or colourimetry of the other image may increase the overall dynamic range of the image which would require additional storage and/or processing.

The image output from the exposure corrector 408 is fed into an error generator 410 which is configured to determine the average mean squared error per pixel in the overlap region for each set of chosen camera parameters.

After the average mean squared error per pixel for one set of parameters has been generated, it is stored along with the camera parameter settings. Then, the camera parameters of the camera producing image B are changed in an arbitrary manner and with arbitrary precision. The average mean squared error per pixel for the changed parameters is calculated and stored along with the camera parameter settings. After the camera parameters of the camera producing image B have been changed across a range, the camera setting with the lowest error are determined. The alignment process is then repeated using less low pass filtering and with finer adjustments in the precision of the parameters. This process is repeated until the correct camera parameters, meeting the required error in the overlap, is generated. The camera parameters are then stored within the image processing device 106, although the camera parameters may be stored anywhere within the system.

It is noted that although the alignment process has been described with reference to live images, it is possible to use a calibration target which is held in front of the camera. However, using this technique has one distinct disadvantage. For a live event, the calibration target may need to be very large (in excess of 10 metres). Additionally, using live images means that if the camera(s) within the cluster move slightly, for example, due to wind, small adjustments can be made in real-time without affecting the live stream. For example, one of the previously stored minima could be used and the alignment process re-calibrated. Accordingly, the camera parameters may be determined "off-line" i.e. not live on air, or "on-line" i.e. live on air if the re-calibration of cameras is required.

Returning now to FIG. 3, the image stitching means 108 will be further described. After the camera parameters have been established, the image output from each camera is fed into a second image projection means 304. The output from the second image projection means 304 is fed into a colour corrector 306. The output from the colour corrector 308 is fed into an exposure corrector 308. It is noted here that the functionality of the second image projection means 304, the colour corrector 306 and the exposure corrector 308 is the same as the image projector 404 and exposure and/or colourimetry corrector 408 described with reference to FIG. 4. This means that the ultra high definition image is subjected to the same corrections as the individual images output from the cameras 104.

The output of the exposure corrector 308 is fed into a parallax error corrector 310. The parallax error corrector 310 prevents "ghosting" which is caused when an object located in the overlap region of two camera images appears twice when the images are stitched together.

In order to address this, in the stitched image, a mask is generated for each of the overlap regions. It is then assumed that any significant errors within the mask are caused by the parallax phenomenon. These errors are quantified using the mean squared average error between pixels in the overlap region. This is a valid assumption as the alignment process minimised any errors due to camera parameters. All individual objects within the masks are labelled using known morphological and object segmentation algorithms. If the significant error between pixels in the overlap region is below a threshold then the two images are blended together. Alternatively, in areas where the error is high, ghosting is deemed to have taken place and only one image from one camera is used. In order to reduce the parallax phenomenon, it is desirable to have the focal points of each camera close together.

Referring to FIG. 1, the output of the image stitching means 108 is fed to the scalable content preparation means 110. As noted previously, various different streams of video are produced from the ultra-high resolution image output from the image stitching means 108. It is desirable, as well as having manually guided or fixed images, that automatically generated segments of the ultra high resolution image are produced. As is understood, the resolution of the segments of the ultra high resolution image is lower than that of the ultra high resolution image. This allows the segments to be multi-cast over a network to the personal display devices 122. Alternatively, or additionally, the segments can be transmitted or broadcast to any device which supports video streaming.

The generation of segments is explained with reference to FIGS. 5A, 5B and 6A. The processing will be carried out by the scalable content preparation means 110. Although FIG. 6A is described with reference to generating a segment from the ultra high definition image produced by the curved virtual focal plane, the segments of the ultra high definition image may be produced using the virtual flat focal plane, or indeed from a single camera output.

Referring to FIG. 6A, a virtual curved focal plane 510 showing a panoramic view of the venue 411 is generated as described with reference to FIGS. 5A and 5B. The segment mimics the field of view of a pseudo-camera, placed in the camera cluster 102, pointing in a particular direction. In other words, the segment will appear to be the section of the ultra high definition image if viewed from the focal point FP of the cameras 104 in the camera cluster 102 with the correct perspective. The segment is provided as the output from the focal plane 602 of the pseudo camera. In FIG. 6A only the image array 516 of two cameras 104 is shown for clarity.

The geometry of the segment (i.e. the size and shape of the segment) is determined. It should be noted that the geometry of the segment (and accordingly, focal plane 602 of the pseudo camera) can be varied and/or set depending on many parameters. For example, if the segment is generated to track a certain player on a soccer pitch, the geometry of the segment can be altered depending on the height of the player. This may be done by the user or automatically.

The segment of the ultra high definition image from curved focal plane 510 to be viewed is then determined by a user or automatically. One example of automatically determining the segment is using player tracking. In this example, the segment may be centred on the player being tracked. The position of the segment is provided by a position signal. In order to assist a controller of the system, a box defining the content of the segment may be provided on the displayed ultra high definition image. This box is useful for the cases where the segment is manually or automatically determined. In the case of the automatically generated segment, if the tracking algorithm stalls (i.e. fails to track the player between two or more successive frames), the controller may manually assist the tracking algorithm to re-find the player. This box may be any shape and/or size and will be determined by the geometry of the segment as well as the geometry of the virtual focal plane 510. The generation of the box will be explained hereinafter.

In order to generate the segment (and thus the focal plane 602 of the pseudo camera), the direction 602' of the pseudo-camera is determined relative to the focal point FP of the cameras 104. More specifically, the direction 602' between a location (which may be a point or small number of pixels) in the ultra high definition image and the focal point FP of the cameras 104 is determined. The direction 602' of the pseudo camera relative to the focal point FP of the cameras 104 can be determined using the camera parameters calculated in the alignment phase. More specifically, the location in the ultra high definition image is a certain direction from the focal point FP of the cameras 104 which is calculated from the camera parameters determined earlier.

After the direction 602' of the pseudo-camera is determined, the focal plane 602 of the pseudo camera is located substantially perpendicular to the direction 602'. The focal plane 602 of the pseudo camera determines the size of the segment. The term substantially perpendicular covers not only close to perpendicular, but also exactly perpendicular. In other words, the focal plane 602 of the pseudo camera will be substantially perpendicular to the focal point FP of the cameras 104 at that location in the ultra high definition image.

In order to determine which pixels from the image array 516 are used on the focal plane 602 of the pseudo camera, mapping is carried out in a similar way to that described with reference to FIGS. 5B and 5D. Specifically, for each pixel in the focal plane 602 of the pseudo camera, the appropriate pixel or interpolated combination value of two or more pixels in the image array 516 is determined using the camera parameters generated in the alignment phase. The mapping takes place for each pixel on the pseudo-camera focal plane 602.

As different segments are required during the course of the live event, for example as different players are tracked, as will be explained hereinafter, this mapping of the pixels from the cameras 104 onto the focal plane 602 of the pseudo-camera takes place for any number of different pseudo-camera positions and thus any number of different pseudo-camera focal planes 602 and different directions 602'. This is shown in FIG. 6B which shows a different position of the pseudo-camera. Also, it should be noted that part of the focal plane of the pseudo camera 602 is in an overlap region. In this case, the mapping on the focal plane 602 of the pseudo camera may require the selection of one or more interpolated pixels from either of the image arrays 516 as explained previously with reference to FIG. 3B. As is seen in FIG. 1, the scalable content means 110 can obtain the pixel information directly from the output of the chromatic aberration corrector 105.

Figure 6C:
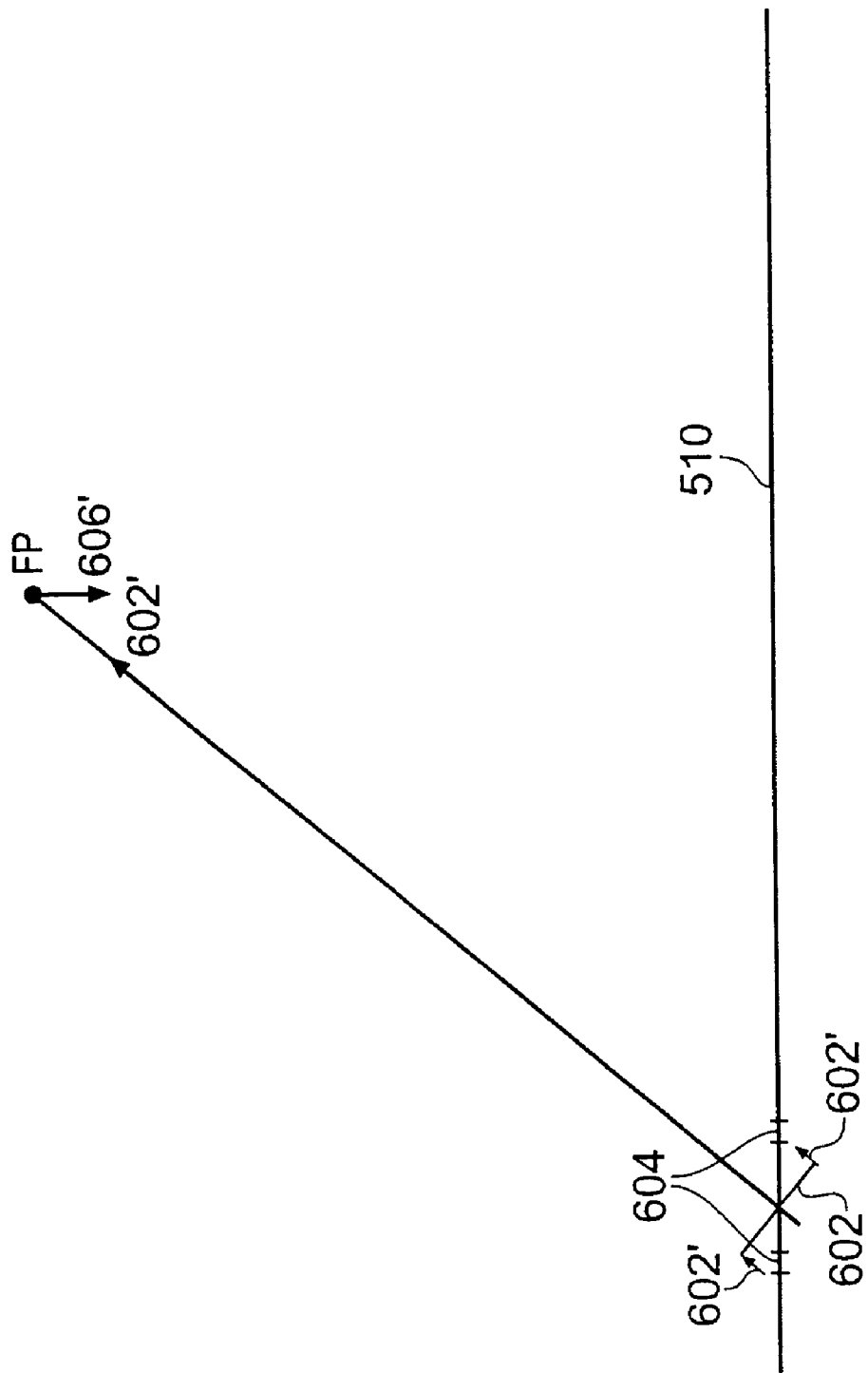
FIG. 6C is a diagram describing outlining the segment generated in the process of FIGS. 6A and 6B on the image generated in the projection process of FIG. 5B.

As noted earlier, the box containing the image which will form part of the segment may be generated. This box is shown in FIG. 1 and is labelled 415. As noted earlier, the location on the ultra high definition image of the segment is determined. This allows the direction 602' between the location on the ultra high resolution image and the focal point FP of the cameras 104 to be determined using the camera parameters. Additionally, as the geometry of the focal plane 602 of the pseudo-camera is known, it is possible to use vector geometry to calculate where on the virtual focal plane 510 the outline of the segment intersects with the image. This is shown in FIG. 6C.

As the scene 101 in FIG. 1 is described with reference to a flat virtual focal plane, for consistency, a flat virtual focal plane is used in FIG. 6C. Additionally, for clarity, the description in FIG. 6C is for a one-dimensional virtual focal plane and focal plane of the pseudo camera. The direction 602' is determined and so the position of the pseudo-camera focal plane 602 is determined for the location in the ultra high definition image. As the geometry of the focal plane 602 of the pseudo-camera has also been previously determined, the outline of the focal plane 602 of the pseudo camera is known. Therefore, using vector geometry it is possible to calculate where on the virtual focal plane 510 (and therefore the ultra high definition image) the outline of the segment will lie. Thus, it is possible to outline on the ultra high definition image the segment which will be produced by the focal plane 602 of the pseudo-camera. As is seen in FIG. 6C, the actual size and shape of the segment will change towards the edges of the ultra high definition image. This replicates the view of the pseudo-camera. For example, as seen in FIG. 6C, the segment will be slightly longer with the pseudo-camera pointing in direction 602' rather than if the pseudo camera was pointing in direction 606'. The slight increase in length is indicated as 604 in FIG. 6C.

In order to automatically generate the segments, the objects of interest will need to be detected in the ultra high resolution image and tracked across the image. The object detection is a probabilistic system based on a combination of shape detection, image recognition and classification technologies. Different kinds of detector are used for different objects, for example a ball detector, player detector and the like. Additionally, it is possible that a number of detectors of the same kind will be used. For example, there may be 22 player detectors, each one trained to detect a different player. The detected object will then be tracked across the ultra high resolution image. This allows a user to watch the segment of the ultra high resolution image in which one particular player is located. This gives the effect of an automatically generated "player cam". The ultra high resolution image reduces the error in the object detection and tracking algorithms.

In the event that the object tracking algorithm loses track of the player, the algorithm will identify the position on the ultra high resolution image where the player was last located. The object detection algorithm will then increase the area of search for the player around this position. This will give the appearance of the image being "zoomed out". Once the player is detected again, the tracking algorithm will then continue tracking the player from the new location. In order to increase the reliability of the player tracking algorithm, it is anticipated that more than one feature will be tracked. For example, both the player's head and shirt number may be tracked. Additionally, in order to improve the viewer's experience, changes in direction of the viewed segments may be limited using temporal filters. This is to mimic more closely the motion of a real television camera.

Each of the generated video streams are then fed to a distribution means 112 for storing in the content database 114 and/or distribution of the content to spectators via the WiFi network 118, cell phone network (not shown) or any other appropriate network that supports video streaming via the data streaming means 116.

Figure 8:
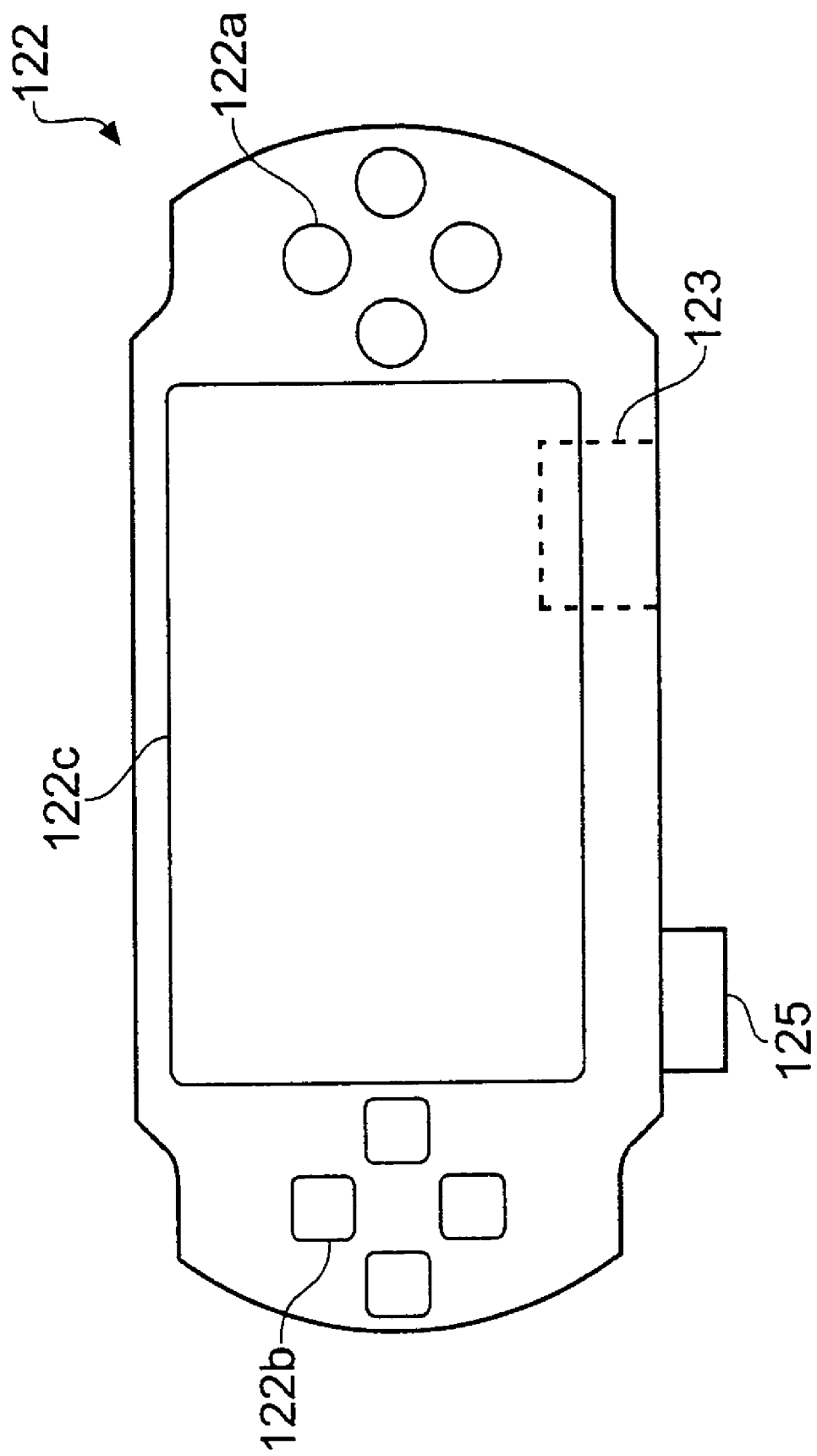
FIG. 8 is a diagram describing a personal display device shown in the system of FIG. 1.

Connected to the WiFi network 118 are a number of personal display devices 122. The personal display devices 122 are described with reference to FIG. 8. Each personal display device 122 has a screen 122c, navigation buttons 122b, selection buttons 122a and a network adaptor 125 to connect the personal display device 122 to a network. The navigation buttons 122b and the selection buttons 122a allow the user to navigate between options available to view the video streams such as which video stream to view and the like. Also provided in the display device 122 is a memory 123 which contains a suitable program to process the received video streams. Such a program may also include a decryption algorithm to decrypt encrypted video streams. The skilled person would appreciate that the program may also be implemented in hardware instead or in addition to the program. In order to ensure that each personal display device 122 can view the video streams, the data streaming means 116 compresses the video stream using the MPEG-4 format. However, it is anticipated that any other compression format is appropriate to allow a reasonable quality video stream to be transmitted at a low bit rate. In the case of MPEG-4, each video stream will have a bit rate of approximately 500 Kb/s.

In order to allow a scalable number of spectators to view the video streams, a multi-cast connection is set-up between the data distribution means 116 and the personal display devices 122. When using the WiFi connection, a Multi-cast address, within the Multi-cast address range, is determined for each video stream. Each personal display device 122 is configured to receive such multi-cast video streams. Further, in order to allow the spectator the opportunity of selecting the most appropriate video stream, a thumbnail version of each video stream will be provided on the personal display device 122 from which the user can select the most appropriate video stream.

In embodiments, during the match, a buffer of 15 seconds for each video stream is recorded in the personal display device 122. This means that should a particular event happen such as a goal is scored or a player is sent off, the personal display device 122 will store that 15 seconds of footage and will automatically display these as highlights for instant play-back or play-back at the end of the match. The personal display device 122 will be notified of such an event by the data distribution means 116. Also, the content database 114 will also store such footage for transmission after or during the match as a separate video stream.

Figure 7:
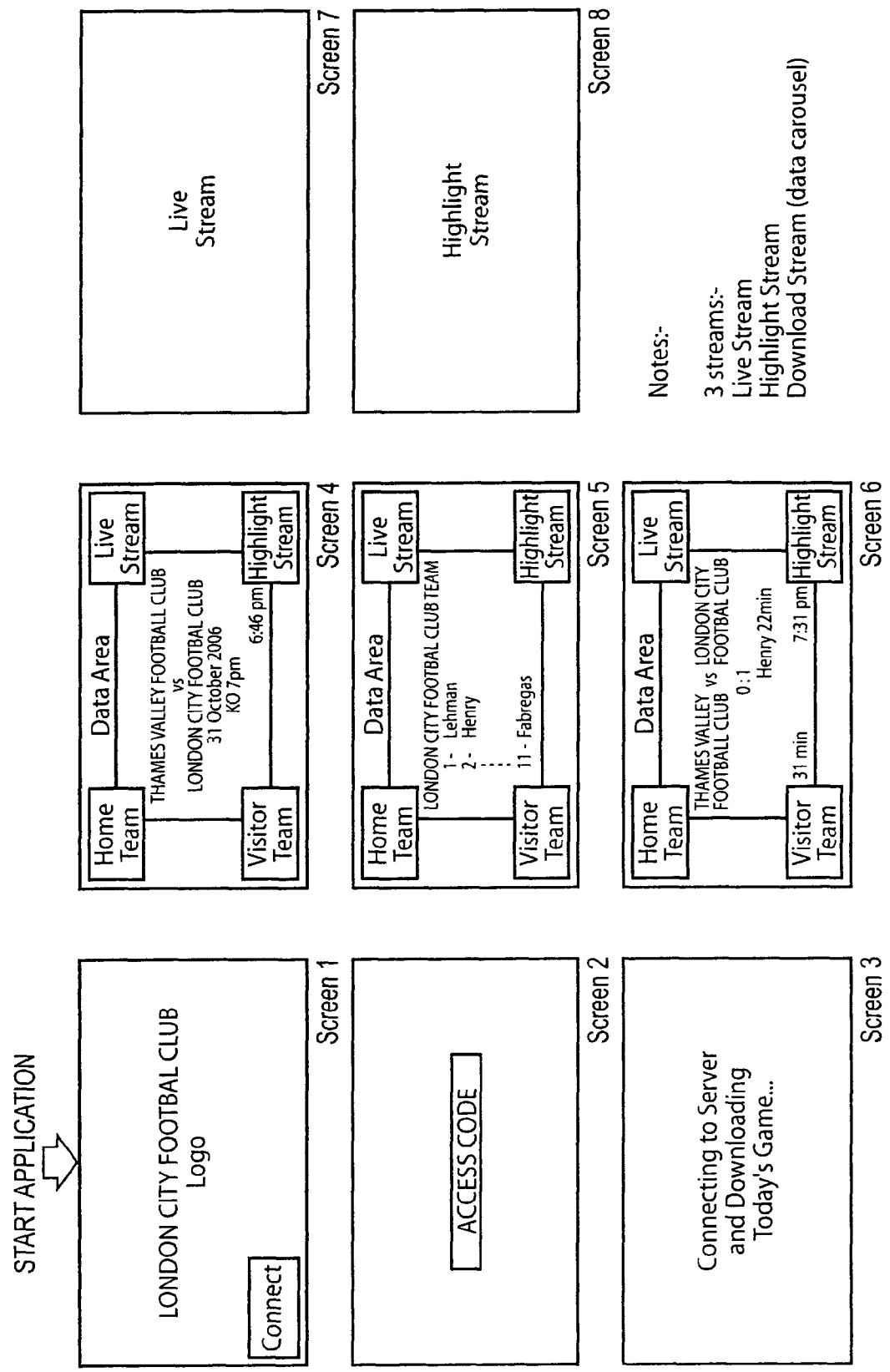
FIG. 7 is a diagram describing a storyboard running on the personal device as shown in FIG. 1.

In FIG. 7, a storyboard explaining a sequence of events on the personal display device 122 is shown. In this storyboard, a user is attending a soccer match between two fictitious soccer teams, Thames Valley Football Club and London City Football Club at Thames Valley Football Club's ground. The application starts to run on the user's personal display device 122. This shows the London City Football Club logo (the user is a London City Football Club supporter). The user enters an access code to enable connection to the server. The access code is provided to the user before the event either when the user rents the personal display device or when they obtain their season ticket. The personal display device connects to the data streaming means 116. The user is then provided with a number of options. In screen 4 of the storyboard, the "home page" is shown. This gives details of the soccer match. Using the navigation buttons 122b on the personal display device 122, the users selects one of the four options. In screen 5, the user has requested details of the London City Football Club team. In screen 6, the user has returned to the "home page" which shows that London City Football Club has scored a goal. The return to the home page may be done automatically under instruction from the data streaming mean 116 or manually by the user. In screen 7, the user is watching the live stream provided by the data stream and in screen 8 the user is watching a highlights stream.

In order to provide this information to the user, the personal display device 122 has access to three data streams. The first is the live stream which is provided by the scaleable content means 110, the second is the highlights stream provided by the content database 114 (the highlights stream may provide highlights from this match or previous matches) and the third is a data stream.

The personal display device 122 "listens" to the data stream and stores and updates stored information onto the memory 123. The data stream may contain information such as team news, goals, substitutes, latest score, goal scorers and match time. Also, the data channel may contain image data, such as highlights of video. However, in embodiments, any ancillary information (sometimes referred to as metadata) may be provided. Such metadata may include information relating to the ultra high definition image or any segments of the ultra high definition image such as good shot markers which may be used by the personal display device 122 to store the appropriate images in the buffer of the memory 123 or may relate to the content of the ultra high definition image or any segments of the ultra high definition image such as a flag when a goal is scored. The personal display device 122 may listen continually or periodically to the data stream. In one embodiment, the data stream would be provided in a data carousel manner using an eXtended Markup Language (XML) file, although other approaches are possible as would be appreciated. Indeed, any suitable technique, such as a digital fountain could be used that provides a good chance of receiving data without use of a back channel.

Each video stream and the data stream will be encrypted. This means, in order to be able to access the video stream on their personal display device 122, a user will have to pay in order to receive a decryption key. Additionally, the users will have flexibility to choose the number of video streams they receive. For example, the user may only select to access the highlight video from the content database 114. Alternatively, the user may pay a larger premium and access all video streams. It is expected that the user would receive these decryption keys before the event after registering the personal display device 122 on a dedicated website. The decryption keys would then be provided. An alternative or additional way in which the user can be provided with the decryption key is by selecting the level of service they require when arriving at the venue. The decryption keys will then be provided over the WiFi network or by other means for example by providing a Flash memory card with the decryption keys loaded thereon. The video streams may be provided on a game by game basis or season by season. It is also possible that the venue will rent out the personal display devices 122 to spectators as well as providing access to the video streams.

Additionally, as noted in FIG. 1, the scalable content means 110 also feeds a video stream to a High Definition Television display 120. This will be provided on a High Definition Serial Digital Interface (HDSDI) output to be connected to a broadcaster's video switch or to an Audio Video Channel (AVC) codec for direct transmission. The stream to the High Definition Television display 120 will be generated using a ball tracking algorithm although manual control will be possible. Further, it is anticipated that the High Definition Television display 120 may also display the whole pitch image. However, due to the size of the image, this would require considerable Letter Box effect. It is also anticipated that the segments of video stream can be fed to a pair of virtual reality goggles 122*a*. In this case, the direction of where the goggles are facing will allow an appropriate video segment to be generated.

The super high definition cinema 124 is located away from the venue. This increases the effective capacity of the venue as well as providing an increase in revenue from refreshments and the like. It is expected also, that the super high definition cinemas 124 may be located in a different country to the event. In this case, the stitched image may be transmitted by satellite. This allows world-wide coverage of an event, for example the soccer World Cup or International cricket matches and the like or concerts such as Live-8 and the like.

The skilled person would appreciate that the processing of the image signals produced by each camera 104 in the camera cluster 102 to produce the ultra-high definition image and the viewing of the video streams on the personal display device 122 may be carried out by at least one micro-processor running a computer program. The computer program will be provided on a storage medium which may be a magnetically or optically readable medium or indeed as a signal provided over a network such as a local area network, a wide area network or the Internet.

Although the foregoing has been described with reference to live events, the skilled person would appreciate that the system may be used in any number of other situations. For example, the present invention may be useful in a surveillance system where tracking of criminal suspects over a wide area is important. As noted above, the present invention is particularly suited to automatic object (including face) detection and tracking because of the high resolution of the image.

Although the foregoing has described the segments of the ultra high definition image as being sent to personal display devices 122, the segments may alternatively, or additionally, be sent to mobile telephones or may be included as a "picture-in-picture" type arrangement in the ultra high definition image. Further, the segment may be generated on recorded ultra-high definition images so that segments of highlights footage can be generated. In this case, metadata may be attributed to the footage such as the camera parameters to allow the segments to be generated.

Although the foregoing has been described with reference to mapping the segment using pixels from the image array of the camera(s) 104, it will be understood that should the images from the camera 104 not be available, it is possible to map the segment using pixel information from the ultra high definition image. In this case, it is useful to have an estimate of one camera parameter such as focal length provided with the image data. However, obtaining segment from the ultra high definition image may reduce the resolution of the segment because the ultra high definition may be composed of interpolated pixel values. Therefore, when the ultra high resolution image is used, the resolution of the generated segment may be reduced.

Figure 9:
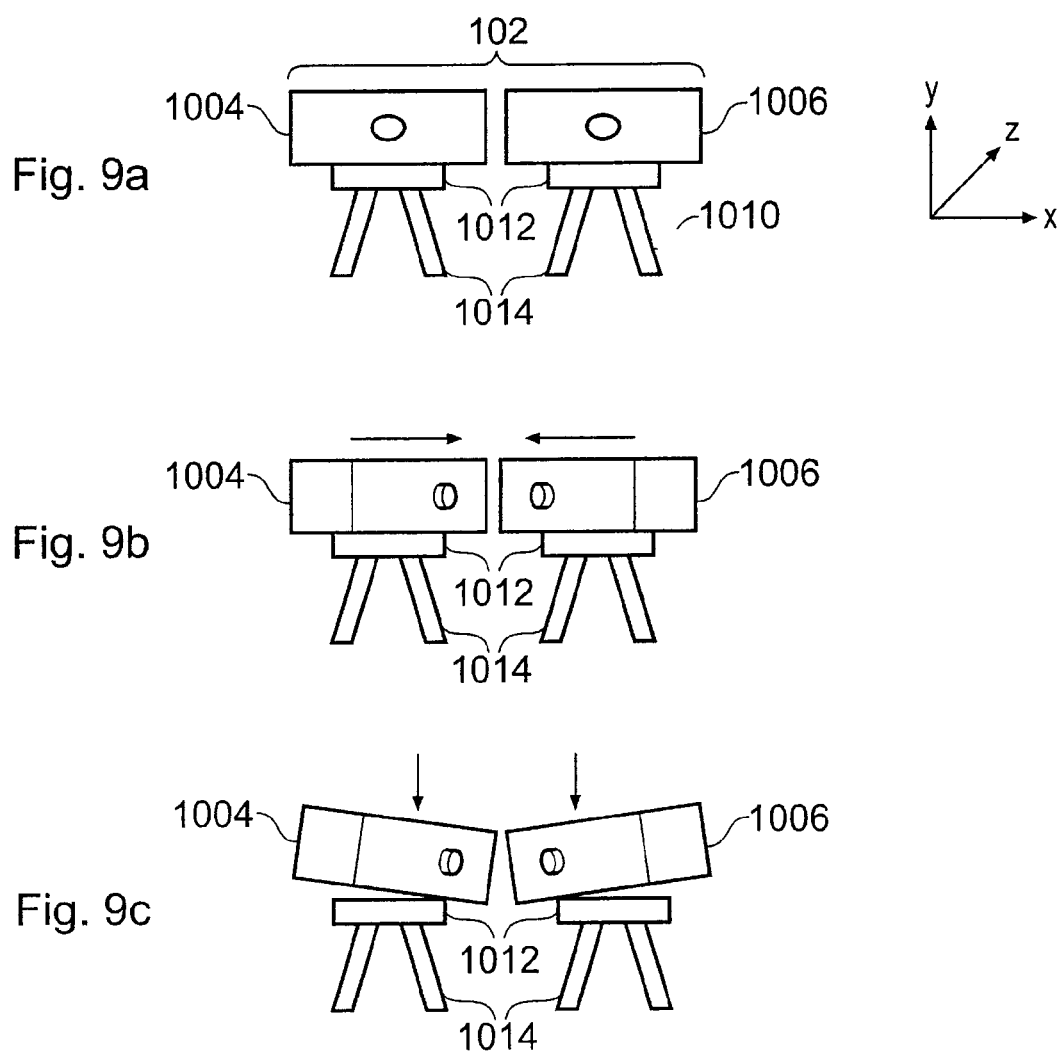
FIG. 9 is a diagram describing one arrangement of camera elements shown in FIG. 1.

Turning now to FIG. 9, as noted above, in order to generate the super-high definition image the camera arrangement 102 is used to capture the event. Each camera element in the camera arrangement 102 has different, but overlapping, fields of view. The camera elements are located near to one another. As noted above, the lens of one camera element should be placed as close to a lens of an adjacent camera element as possible without actually touching. This reduces parallax effects and ensures that the lens of one camera element is not captured in the field of view of the other camera element. The captured images are then stitched together to form the ultra-high definition image. FIG. 9 describes one way of producing the camera arrangement 102 having two co-located camera elements 1004 and 1006.

In part (a) of FIG. 9, in embodiments of the present invention each camera element 1004 and 1006 is a high definition camera mounted in landscape mode on an individual camera stand 1010. As shown in part (a) of FIG. 9, each camera element has a lens initially directed out of the page. Each camera stand 1010 has a mounting bracket 1012 upon which the respective camera element 1004 and 1006 is mounted. The mounting bracket 1012 secures the camera element 1004 and 1006 to legs 1014 which support, and elevate, the camera element.

The mounting bracket 1012 allows the camera element which is mounted thereon to be controlled using pitch and yaw. Pitch is a conventional term meaning bidirectional movement in the vertical plane (the y-axis in FIG. 9) and yaw is a conventional term meaning bidirectional movement in the horizontal plane (the x-axis in FIG. 9).

As noted earlier, the individual camera elements are used in the camera arrangement to give the effect of a single camera with a very large field of view. In fact, the overall field of view of the camera arrangement 102 is the sum of the field of view of each camera element 1004 and 1006 subtract the region in which the field of view of each camera element 1004 and 1006 overlap. For example, if the camera arrangement 102 has two camera elements 1004 and 1006, each having a field of view of 60° and having a 5° overlap, the effective overall field of view of the camera arrangement 102 is 115°.

In order to produce such an overall field of view, the yaw of each camera element 1004 and 1006 is adjusted so that the camera lens points in an appropriate direction. To reduce parallax effects it is useful to have similar focal points for each camera element. Therefore, it is useful to locate the lens of each camera element close to one another. Such an arrangement is shown in part (b) of FIG. 9.

In many situations, such as capturing a sporting event, the camera arrangement 102 will be located in a position that is elevated compared with the event being captured. This means that in order to capture the event, the pitch of each camera element 1004 and 1006 will be adjusted. In particular, as shown in part (c) of FIG. 9, each camera element 1004 and 1006 will be adjusted so that the camera lens is directed down and towards the event to be captured.

Figure 10:
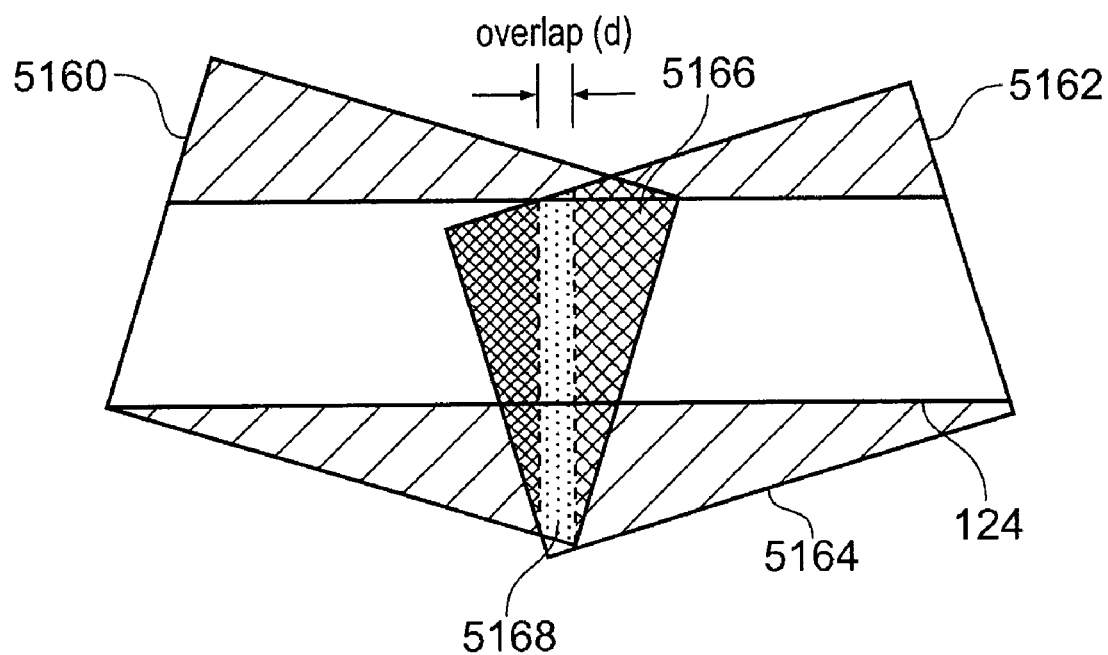
FIG. 10 is a diagram describing the focal plane of the camera arrangement shown in FIG. 9.

In FIG. 10, the focal plane 5160 of camera element 1004 and the focal plane 5162 of camera element 1006 is shown. Additionally, the area of overlap 5168 required to enable the image captured by each camera element 1004 and 1006 to be stitched together is shown. The area of overlap 5168 is highlighted with dots in FIG. 10. The resultant ultra high definition image 124 generated by the stitching is also shown. The area of overlap 5168 is required to stitch the images captured by each camera element 1004 and 1006 together. The size of the area of overlap 5168 will vary depending on the event to be captured. For example, an event with a large amount of detail would require a smaller area of overlap than an event with a smaller level of detail. This would be appreciated by the skilled person. The area of overlap 5168 is of arbitrary size "d" in FIG. 10 because the required area of overlap depends on the event to be captured. In the present situation, where a soccer match is being captured, the area of overlap, d, will be around 5°. It is noted here however that different situations may demand larger or smaller overlaps.

As the overlap of area d is required, the focal planes 5160 and 5162 need to overlap sufficiently to achieve this minimum overlap area. As illustrated in FIG. 10, because of this, there is an area of additional, unnecessary overlap 5166 defined by the cross-hatched lines. This unnecessary overlap 5166 results in an overall reduction in horizontal resolution of the ultra high definition image. Moreover, as shown by the hatched lines, there is an area 5164 above and below the super high definition image 124 which does not form part of the stitched ultra high definition image. This unnecessary area 5164 results in a reduced vertical resolution ultra high definition image.

In order to improve the horizontal and vertical resolution of the ultra or super high definition image, one or each of the camera elements 1004 and 1006 in an embodiment of the present invention is mounted on a different type of mounting bracket 1012'. Similarly to the mounting bracket 1012 in FIG. 9, the mounting bracket 1012' of this embodiment has pitch and yaw control. However, additionally, the mounting bracket 1012' of this embodiment allows the respective camera element 1004 and 1006 to roll. Roll is a conventional term meaning rotational motion around a central axis substantially through the centre axis of the lens.

Thus, after the camera elements 1004 and 1006 have been moved to the position explained with reference to FIG. 9, the roll of one or each camera element 1004 and 1006 is adjusted. In the case of the camera elements of FIG. 11, camera element 1004 is rolled anti-clockwise (counter-clockwise) when looking through the lens of the camera element 1004 and camera element 1006 is rolled clockwise when looking through the lens of the camera element 1006. It is noted that, in this case both camera elements 1004 and 1006 are rolled. However, this is not necessarily always the case. It may be that only one camera element 1004 and 1006 need to be rolled.

The result of this roll is that one edge of the focal plane of camera element 5160 and one edge of the focal plane of camera element 5162 are substantially parallel to each other. The area of overlap 5168 is still d as is required to enable stitching of the images captured by camera element 1004 and camera element 1006. However, as is illustrated in FIG. 11, the proportion of the focal plane 5160 of camera element 1004 and of the focal plane 5162 of camera element 1006 which is used to generate the super high definition image 124 is increased. Accordingly, the area 5164 defined by the hatched lines is reduced and so improving both the vertical and horizontal resolution of the super high definition image.

Moreover, as one edge of the focal plane 5160 of camera element 1004 and one edge of the focal plane 5162 of camera element 1006 are adjusted to be substantially parallel to one another, the yaw of camera elements 1004 and 1006 are adjusted to maximise the overall field of view of the camera arrangement 102 whilst still providing at least the minimum overlap area required to perform image stitching. Thus, by using this embodiment of the present invention, the horizontal resolution of the super high definition image is improved.

However, mounting bracket 1012' which includes the roll facility is not as common as mounting bracket 1012 which does not include such a facility. Accordingly, the cost of mounting bracket 1012' is higher than the cost of mounting bracket 1012. Additionally, by applying roll to the camera element 1004 and/or 1006 a load imbalance is applied to the camera support. Due to the weight of high definition camera elements 1004 and 1006 the load imbalance on each camera support will be not insignificant.

Figure 12:
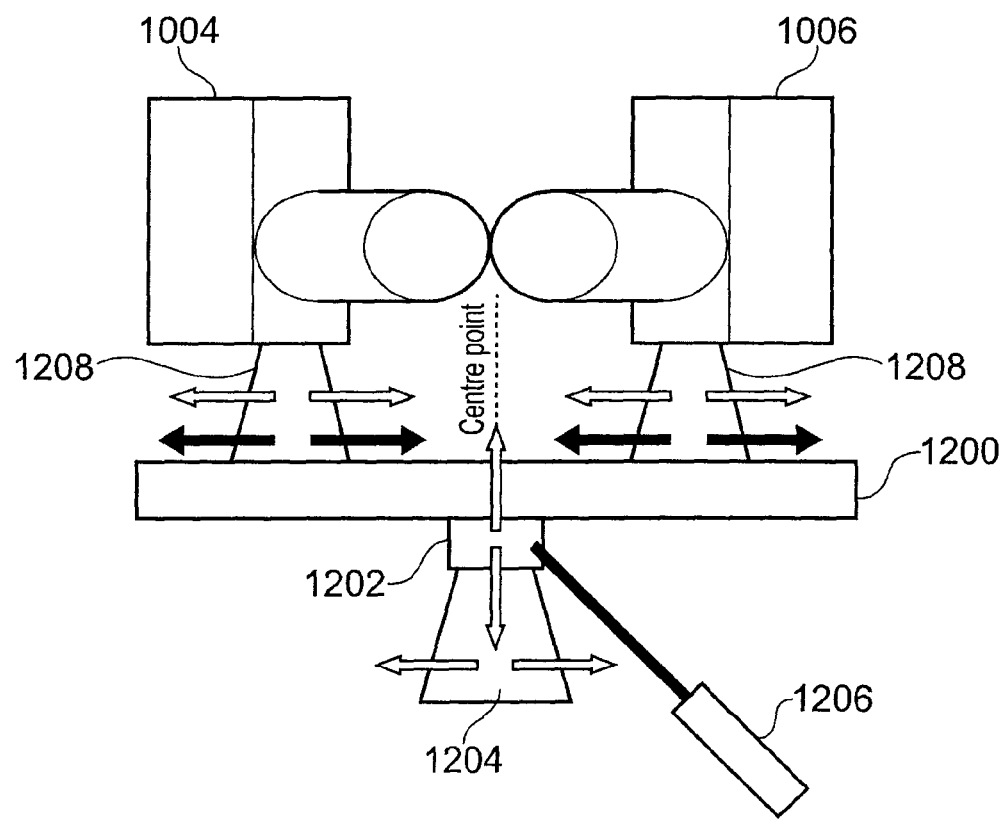
FIG. 12 is a diagram describing a second embodiment of the camera arrangement of the present invention.

In order to improve this embodiment, a further embodiment of the present invention will now be described with reference to FIG. 12.

Camera elements 1004 and 1006 are mounted on respective third mounting brackets 1208. The third mounting brackets 1208 need only be capable of yaw movement, although the third mounting brackets 1208 may also be capable of pitch movement. Although not preferable, the third mounting bracket 1208 may include roll movement, but as explained above, a mounting bracket including roll movement is more expensive and tends to be the subject of load imbalance when a camera element 1004 and 1006 is mounted thereon.

The third mounting brackets 1208 are located on a camera platform 1200. The third mounting brackets 1208 are mounted on the platform 1200 so that the third mounting brackets 1208 may move bi-directionally along the platform 1200. Camera platform 1200 is mounted on a platform bracket 1202 which allows yaw and pitch movement. The yaw and pitch movement is controlled by control arm 1206. The platform bracket 1202 is mounted onto a support 1204 which may be a table top stand (as shown) or legs. The support 1204 is used to support the weight of the camera arrangement.

Figure 13:
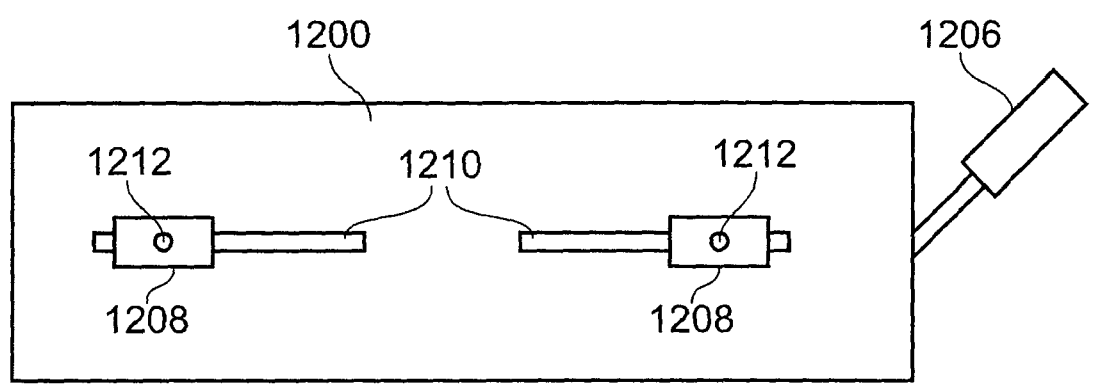
FIG. 13 is a plan view of the platform shown in FIG. 12.

Referring to FIG. 13, the mounting brackets 1208 engage with respective runners 1210. The runners 1210 may be located on the surface of the platform 1200 or may be located below the surface of the platform 1200. Also, although one individual runner per mounting bracket is shown, the skilled person will appreciate that any number of individual runners may be equally used. Indeed, only a single runner may be provided along which the mounting brackets 1208 may move. In order to engage with the respective runner 1210, the mounting bracket 1208 must be suitably shaped. The runners 1210 allow the respective mounting bracket 1208 to be moved therealong. From the plan view of the platform 1200 shown in FIG. 13, a screw fitting 1212 is shown on the mounting bracket 1208 which engages the respective camera element 1004 and 1006 to the mounting bracket 1208. Other types of fitting may also or instead be used as would be appreciated.

Although not shown, each mounting bracket 1208 also includes a locking mechanism which, when activated, locks the mounting bracket 1208 in a fixed position along the runner 1210. When the locking mechanism is not activated, the mounting bracket 1208 is free to move along the runner 1210.

Referring back to FIG. 12, in use, each respective camera element 1004 and 1006 is mounted onto a mounting bracket 1208. The respective camera element 1004 and 1006 engages with the screw fitting 1212. The camera element 1004 and 1006 are arranged so that the pitch of each camera element is the same, which may be for example 0° with respect to the horizontal axis of the field of view. The yaw of each camera element 1004 and 1006 is adjusted to obtain the correct field of view of the event to be captured. Additionally, the yaw is adjusted to ensure that there is appropriate overlap between each field of view. In this embodiment, the yaw of each camera element 1004 and 1006 is adjusted to achieve an overlap of 5°.

The locking mechanism on each mounting bracket 1208 is deactivated (if it was previously activated) so that the mounting brackets 1208, and consequently the respective camera elements 1004 and 1006, can move along the runner 1210. The mounting brackets 1208 are moved along the runner 1210 to reduce the distance between each camera element 1004 and 1006. In other words, the camera elements 1004 and 1006 are moved towards each other. Each camera element 1004 and 1006 are moved together so that the lens of each camera element 1004 and 1006 is as close together as possible without touching. This is to ensure that the lens of one camera element does not appear in the field of view of the other camera element. Additionally, by arranging the camera elements to be close together allows the focal point of each camera element 1004 and 1006 to be very similar. As noted above, this reduces parallax effects. However, this procedure may alter the area of overlap. If this does happen, then the yaw of any one or more of the camera elements is adjusted to maintain the minimum overlap.

When a suitable distance apart, and with the suitable overlap, the locking mechanism is activated to fix the position of the mounting bracket 1208 along the runner 1210. By locking the camera elements 1004 and 1006 in position in this manner, the edges of each focal plane of each camera element 1004 and 1006 are substantially parallel to one another, with the required overlap. This results in the focal plane arrangement shown in FIG. 11.

Once the camera elements 1004 and 1006 are fixed in position, the pitch and yaw of the camera platform 1200 can be adjusted by the control handle 1206. This allows the focal plane arrangement to be moved without the individual focal plane of either camera element 1004 and 1006 being moved relative to the other camera element 1006 and 1004. Consequently, the pitch and yaw of the focal plane arrangement of FIG. 11 is adjusted as a whole meaning that the advantageous focal plane arrangement of FIG. 11 is not affected by adjusting the pitch and yaw of the camera platform 1200.

It is anticipated, in one embodiment, that the yaw of the camera elements 1004 and 1006 on the camera platform 1200 will be adjusted to the correct orientation before the camera platform 1200 is located in the stadium. However, the invention is not so limited. Further, although the forgoing has been described with a separate runner for each camera element, the invention is not so limited. Indeed, in one embodiment it is anticipated that the camera platform 1200 would have one runner and each camera element 1004 and 1006 would be mounted on a common runner. This provides an additional advantage of having a generic platform allowing any number of camera elements to be located thereon. Additionally, although the forgoing has been described with a camera arrangement containing only two camera elements, the invention is not so limited. For example, the camera arrangement may have any number of camera elements, such as six or eight camera elements. Additionally, the camera elements have been described as being positioned in the landscape mode. However, the camera elements may be positioned in the portrait mode. This is useful to increase vertical resolution and as would be appreciated, would be particularly applicable when the camera arrangement consists of more than two camera elements, such as six camera elements.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined in the appended claims.

We claim:

1. A camera arrangement, comprising:
   a plurality of substantially co-located camera elements, each camera element having a focal plane upon which a respective field of view is imparted for forming a stitched image from the respective fields of view; and
   a controller configured to generate pitch, yaw and roll parameters for each of said camera elements, wherein
   the field of view of one of said camera elements has an overlap with the field of view of an adjacent camera element which is adjacent to said one camera element,
   an area of the overlap is minimized based on a minimum dimension necessary for forming the stitched image to maximize an area of the stitched image, and
   after a pitch movement of the field of view of said one camera element, the positioning of said one camera element is such that said area of the overlap is minimized by rolling said one camera element, said adjacent camera element or both based on the roll parameters generated by said controller such that said overlap is substantially uniform along a length of the overlap.

2. A camera arrangement according to claim 1, wherein said one camera element or said adjacent camera element comprises a camera element adjuster operable to adjust any one or more of pitch, yaw and roll positioning of said one camera element or said adjacent camera element so that said overlap is substantially uniform along the length of the overlap.

3. A camera arrangement according to claim 1, wherein a roll of either said one camera element or said adjacent camera element is adjustable after said movement of said field of view of said one camera element along a vertical axis of the field of view.

4. A camera arrangement according to claim 1, comprising an arrangement adjuster operative to adjust either one of pitch and yaw of the camera arrangement.

5. A camera arrangement according to claim 4, comprising a platform having a mounting, wherein the platform is operable to locate said one and said adjacent camera elements thereon, and the mounting is arranged to adjust either the pitch and the yaw of the camera arrangement.

6. A camera arrangement according to claim 4, wherein said arrangement adjuster is operable such that said pitch or yaw of the camera arrangement is adjustable when the overlap between the field of view is substantially constant along the length of the overlap.

7. A camera arrangement according to claim 4, wherein at least one of the camera elements is fixedly mounted to the arrangement adjuster.

8. A method of arranging a plurality of co-located camera elements, comprising:
   overlapping the field of view of one camera element with the field of view of at least one adjacent camera element to form an overlap, wherein the fields of view are movable and imparted onto a focal plane of said respective camera elements for forming a stitched image from the fields of view; and
   minimizing an area of the overlap based on a minimum dimension necessary for forming the stitched image to maximize an area of the stitched image by positioning, after a pitch movement of said field of view of said one camera element, said one camera element such that said overlap is minimized by rolling said one camera element, said adjacent camera element or both such that said overlap is substantially uniform along a length of the overlap.

9. A method according to claim 8, comprising adjusting any one of pitch, yaw and roll positioning of said one camera element or said adjacent camera element so that said overlap is substantially uniform along the length of the overlap.

10. A method according to claim 8, comprising adjusting a roll of either one of said one camera element or said adjacent camera element after said movement of said field of view of said one camera element along a vertical axis of the field of view.

11. A method according to claim 8, comprising adjusting either one of pitch and yaw of the camera arrangement.

12. A method according to claim 11, comprising mounting, on a platform, said one and said adjacent camera elements and adjusting either the pitch and the yaw of platform to adjust either the pitch and yaw of the camera arrangement.

13. A method according to claim 11, comprising adjusting either one of said pitch or yaw of the camera arrangement when said overlap between the field of view is substantially constant along the length of the overlap.

14. A method according to claim 11, comprising mounting, on a platform said one and said adjacent camera elements, and adjusting the yaw of said one camera element or said adjacent camera element to achieve desired overlap.

15. A method according to claim 11, comprising fixedly mounting at least one camera element to said platform.

16. A camera arrangement, comprising:
a plurality of imaging means for capturing images, each imaging means having a focal plane upon which a respective field of view is imparted for forming a stitched image from the respective fields of view; and
controlling means for generating pitch, yaw and roll parameters for each of said imaging means, wherein
the field of view of one of said imaging means has an overlap with the field of view of an adjacent imaging means which is adjacent to said one imaging means, an area of the overlap is minimized based on a minimum dimension necessary for forming the stitched image to maximize an area of the stitched image, and
after a pitch movement of the field of view of said one imaging means, the positioning of said one imaging means is such that said area of the overlap is minimized by rolling said one imaging means, said adjacent imaging means or both based on the roll parameters generated by said controlling means such that said overlap is substantially uniform along a length of the overlap.

* * * * *